United States Patent [19]
Black

[11] Patent Number: 6,062,508
[45] Date of Patent: May 16, 2000

[54] COMPOUND AIRCRAFT

[76] Inventor: Franklin E. Black, 1681 Yellowglen Dr., Cincinnati, Ohio 45255

[21] Appl. No.: 09/139,898

[22] Filed: Aug. 26, 1998

[51] Int. Cl.[7] .................................................. B64C 27/02
[52] U.S. Cl. ...................... 244/8; 244/17.11; 244/17.23; 244/17.25; 244/23 B; 244/23 C
[58] Field of Search ................................. 244/2, 6, 7 R, 244/8, 17.11, 17.23, 17.25, 23 B, 23 C

[56] References Cited

U.S. PATENT DOCUMENTS

| | | | |
|---|---|---|---|
| 2,950,074 | 8/1960 | Apostolescu | 244/17.23 |
| 3,933,324 | 1/1976 | Ostrowski | 244/17.23 |
| 4,730,795 | 3/1988 | David | 244/7 R |
| 4,913,376 | 4/1990 | Black | 244/8 |
| 5,791,592 | 8/1998 | Nolan et al. | 244/17.11 |

Primary Examiner—J. Woodrow Eldred
Attorney, Agent, or Firm—Davidson & Gribbell, LLP

[57] ABSTRACT

A lift rotor assembly for a compound aircraft having a fuselage, including at least one circular disk structure with a plurality of bladelets spaced peripherally thereabout, a drive shaft coupled to a power source at a first end for rotating the drive shaft at low torque, a hub coupled to each circular disk structure and being located concentrically about the drive shaft, a gear drive coupled to a second end of the drive shaft opposite the first drive shaft end, and a first gear coupled to the gear drive and the hub for the circular disk structure located adjacent to the gear drive, wherein the first gear is operated at high torque to rotate one of the circular disk structures. The lift rotor assembly also includes a gear reduction apparatus associated with the gear drive in order to operate the first gear at high torque, as well as a constant velocity joint connecting an upper portion and a lower portion of the drive shaft.

29 Claims, 9 Drawing Sheets

COMPOUND AIRCRAFT

BACKGROUND OF THE INVENTION

1. Field of the Invention

The present invention relates generally to compound aircraft and, more particularly, to a lift rotor system and bladelet stowage system for a compound aircraft having at least one circular disk structure.

2. Description of Related Art

The present invention relates to certain improvements made to an autogyro as disclosed and shown in U.S. Pat. No. 4,913,376, which is owned by the inventor of the present invention and is hereby incorporated by reference. As seen therein, the autogyro incorporates a pair of closely spaced, rigid counter-rotating circular planform wings or disk structures which each includes a plurality of rotor bladelets spaced peripherally thereabout. The disk structures are gimbal mounted above a fuselage for the autogyro and includes a drive system for providing power transfer from a propulsion engine to the disk structures.

With respect to the drive system disclosed in the '376 patent, it will be noted that it is a high speed/low torque belt driven system which translates into low speed/high torque at gearing associated with the lower disk. This increases the stress and therefore the requirements on such gearing and related components. Moreover, the drive components are subject to movement permitted by the gimbal mounting which creates certain undesirable strains on such a belt-type drive system. Accordingly, it has been found that the previous belt driven system, while functional, is not as robust and reliable as desired.

Further, it has also been found desirable for an aircraft to be operational in both a rotary wing mode and a fixed wing mode (also known as a "compound aircraft"). In this way, the aircraft can be flown in a rotary wing mode for take-off and landing, but in the fixed wing mode during flight once an appropriate altitude and speed have been attained.

Accordingly, it is a primary object of the present invention to provide a robust drive system for a compound aircraft which increases reliability in such aircraft.

It is another object of the present invention to provide a drive system for a compound aircraft which is more rugged in design, whereby the components undergoing high torque are minimized.

It is still another object of the present invention to provide a drive system for a compound aircraft which is better able to accommodate movement associated with gimbal mounting of the rotor with the aircraft.

Yet another object of the present invention is to provide a drive system for a compound aircraft which is positioned outside the fuselage thereof so as to reduce noise within the cockpit of the aircraft.

Still another object of the present invention is to provide a stowage system for the bladelets with respect to the disk structures so the aircraft may be operated in both rotary and fixed wing mode.

Another object of the present invention is to provide safeguards within the bladelet stowage system so as to have the bladelets associated with each disk move in unison and be located in similar position with respect to the disk periphery.

These objects and other features of the present invention will become more readily apparent upon reference to the following description when taken in conjunction with the following drawings.

SUMMARY OF THE INVENTION

In accordance with a first aspect of the present invention, a lift rotor assembly for a compound aircraft having a fuselage is disclosed as including at least one circular disk structure with a plurality of bladelets spaced peripherally thereabout, a drive shaft coupled to a power source at-a first end for rotating the drive shaft at low torque, a hub coupled to each circular disk structure and being located concentrically about the drive shaft, a gear drive coupled to a second end of the drive shaft opposite the first drive shaft end, and a first gear coupled to the gear drive and the hub for the circular disk structure located adjacent to the gear drive, wherein the first gear is operated at high torque to rotate one of the circular disk structures. The lift rotor assembly also includes a gear reduction apparatus associated with the gear drive to operate the first gear at high torque, as well as a constant velocity joint connecting an upper portion and a lower portion of the drive shaft.

In accordance with a second aspect of the present invention, a lift rotor assembly for a compound aircraft having a fuselage is disclosed as including: a first circular disk structure with a plurality of bladelets spaced peripherally thereabout; a second circular disk structure with a plurality of bladelets spaced peripherally thereabout, the second circular disk structure being located below the first circular disk structure; a drive shaft coupled to a power source at a first end for rotating the drive shaft at low torque; a first hub coupled to the first circular disk structure, the first hub being located concentrically about the drive shaft; a second hub coupled to the second circular disk structure, the second hub being located concentrically about the drive shaft; a gear drive coupled to a second end of the drive shaft opposite the first drive shaft end; a first gear coupled to the gear drive and the first hub, wherein the first gear is operated at high torque to rotate the first circular disk structure; and a second gear connecting the first hub and the second hub, wherein the second gear causes the second circular disk structure to be rotated in a direction opposite said first circular disk structure.

In accordance with a third aspect of the present invention, a compound aircraft formed with a fuselage body and having vertical ascent, hovering and descent capabilities along with conventional take-off and landing capabilities is disclosed as including: an upper circular lift disk structure having a set of bladelets uniformly distributed around and secured to the periphery thereof; a lower circular lift disk structure having a set of bladelets uniformly distributed around and secured to the periphery thereof, the lower circular lift disk structure being positioned with respect to the upper circular lift disk structure so as to perform as a single aerodynamic lifting body; a lift rotor assembly for driving the upper and lower circular lift disk structures; a power supply; a power transfer shaft coupled to the power supply at a first end and the lift rotor assembly at a second end; a clutch for selectively engaging and disengaging the power transfer shaft from the power supply; a source of forward flight propulsion for providing a range of thrust; and a coupling between the power supply and the forward flight propulsion source.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
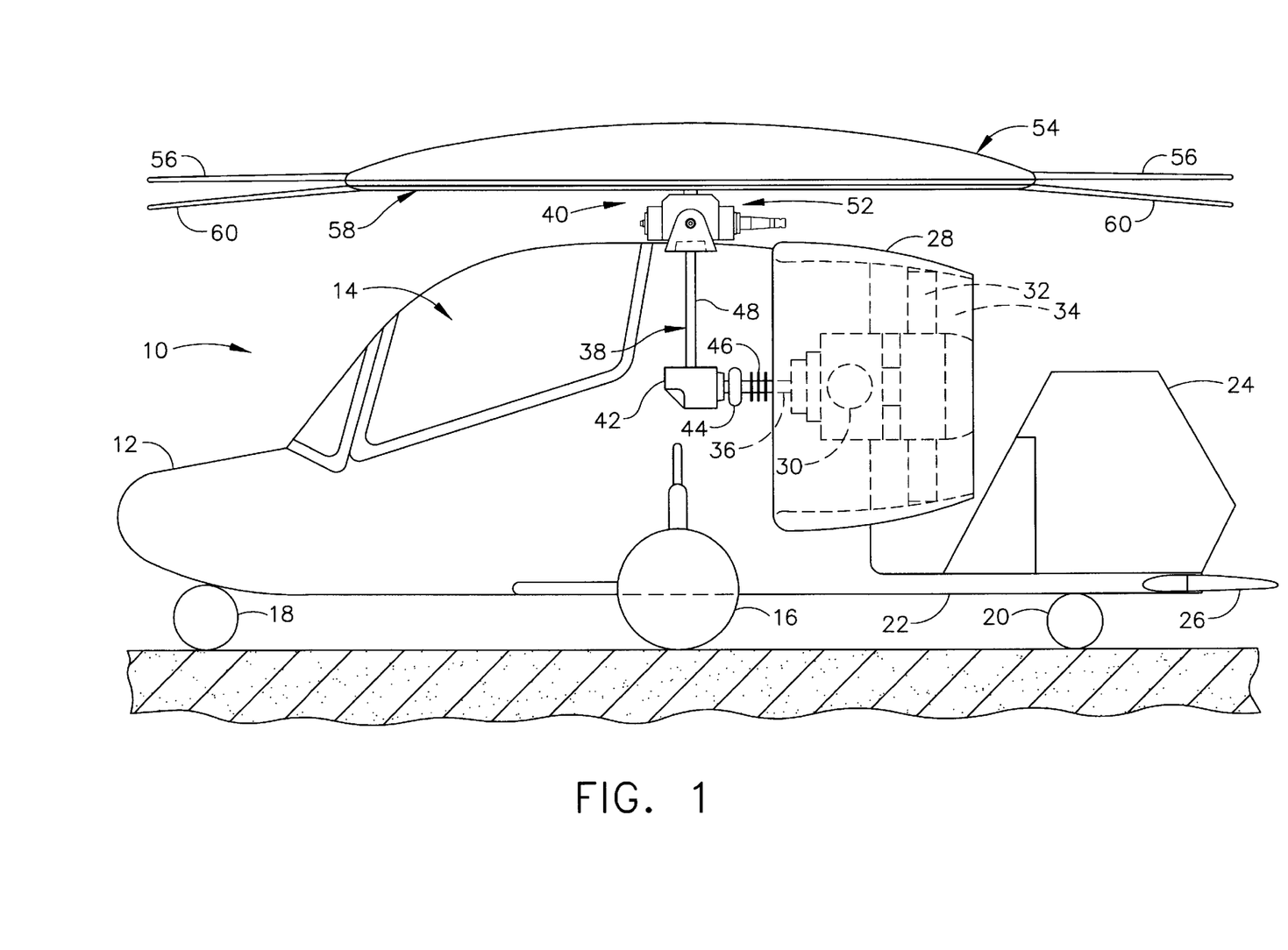
FIG. 1 is a side view of a compound aircraft including a drive system in accordance with the present invention.

Referring now to the drawings in detail, wherein identical numerals indicate the same elements throughout the figures, FIG. 1 depicts a compound aircraft generally designated by the numeral 10. It will be understood that compound aircraft 10 may be operated in either a rotary or a fixed wing configuration depending on a few factors as discussed herein. Further, compound aircraft 10 is similar in several respects to the autogyro shown and described in U.S. Pat. No. 4,913,376 to Black, which is also owned by the inventor of the present invention and is hereby incorporated by reference.

More specifically, compound aircraft 10 includes a fuselage body 12 which has a cabin or cockpit area 14 therein. Main landing gear 16 is located approximately midway between the nose and tail of fuselage body 12, with a nose wheel 18 and a tail wheel 20 also being provided. It will further be seen that a tail boom 22, a rudder 24, and a horizontal stabilizer 26 are located at the aft end of fuselage body 12 to assist in controlling compound aircraft 10. A shroud 28 houses an engine 30 preferably having a variable pitch blade 32, engine 30 being retained within shroud 28 via struts 34.

As further seen in FIG. 1, a power transfer shaft 36 is preferably connected to engine 30 and is utilized to provide power to a drive shaft 38 of a lift rotor assembly 40 for compound aircraft 10. In accordance with the present invention, power transfer shaft 36 is connected to a 90° gear box 42 at an aft end thereof by a coupler 44. A multi-plate type clutch 46 is located between power transfer shaft 36 and coupler 44 so that the power provided by engine 30 can be selectively engaged and disengaged depending on what mode compound aircraft 10 is intended to be operated. Drive shaft 38, which specifically is a lower drive shaft portion 48, is then connected to an upwardly facing end of gear box 42 at a lower end so that drive shaft 38 is oriented substantially perpendicularly to power transfer shaft 36. It will then be noted in FIG. 3 that lower drive shaft portion 48 is connected to an upper drive shaft portion 50 by means of a gimbal mounting assembly (generally indicated by numeral 52), which will be discussed in more detail hereinafter.

It will be seen that upper drive shaft portion 50 extends upwardly from gimbal mounting assembly 52 and is used to power at least one circular disk structure as discussed in greater detail hereinafter. Preferably, compound aircraft 10 includes a first circular disk structure 54 having a plurality of bladelets 56 spaced peripherally thereabout located adjacent to an upper end of upper drive shaft portion 50 opposite a lower end connected to gimbal mounting assembly 52, as well as a second circular disk structure 58 having a plurality of bladelets 60 spaced peripherally thereabout which is located adjacent to and below first circular disk structure 54. It will be appreciated that first and second circular disk structures 54 and 58 are preferably positioned with respect to each other so as to perform as a single aerodynamic lifting body. In this regard, first and second circular disk structures 54 and 58 may be utilized to cooperatively form an airfoil having no asymmetric aerodynamic effects.

Figure 2:
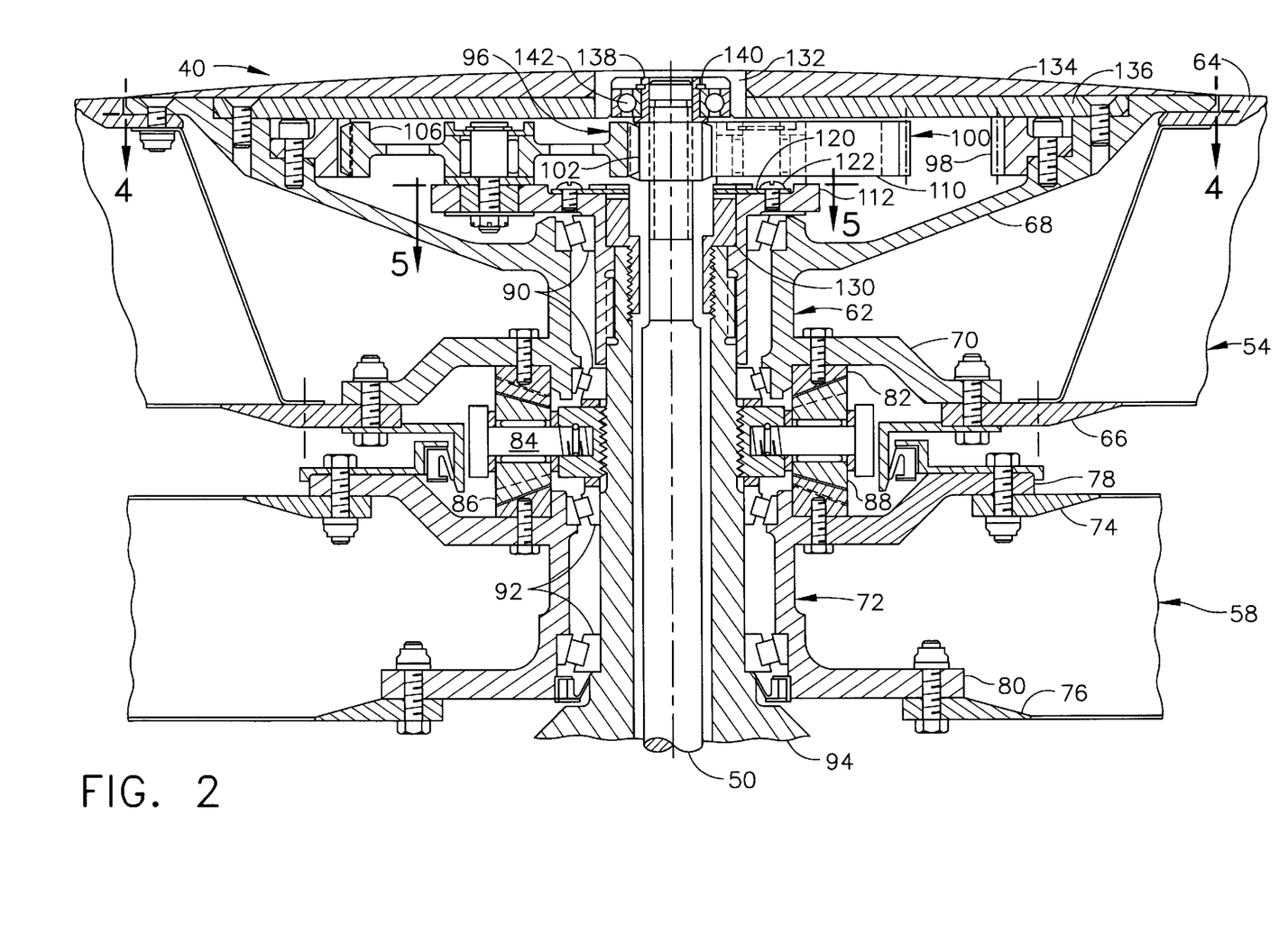
FIG. 2 is an elevational view of the disk hub assembly for the compound aircraft depicted in FIG. 1, taken in section in the plane of symmetry.

The present invention is primarily concerned with lift rotor assembly 40, which has been improved over that disclosed in the '376 patent. As shown in FIG. 2, lift rotor assembly 40 is now a shaft driven system instead of a belt driven system, thereby making it simpler and more rugged in design. It also is better able to accommodate movement associated with gimbal mounting of lift rotor assembly 40 with fuselage body 12. In particular, upper drive shaft portion 50 is used to provide rotation of upper circular disk structure 54 at low speed/high torque instead of the lift rotor assembly in the '376 patent providing rotation of the lower circular disk structure through certain gearing connected to the belt drive system. This improved lift rotor assembly 40 is more robust and reliable, yet lightweight, since more components are used in the conversion to high torque. Further, the shaft drive system is able to be positioned outside fuselage body 12, which reduces the amount of noise experienced within cabin 14.

As best seen in FIG. 2, lift rotor assembly 40 of aircraft 10 includes an upper hub 62 coupled to an upper wing root 64 and a lower wing root 66 of upper circular lift disk structure 54 via bolted connections to an upper cone 68 and a lower flange 70, respectively, and is located concentrically about upper drive shaft portion 50. Likewise, a lower hub 72 is coupled to an upper wing root 74 and a lower wing root 76 of lower circular disk structure 58 by bolted connections to an upper flange 78 and a lower flange 80, respectively, and is located concentrically about upper drive shaft portion 50. It will be noted that upper hub 62 is coupled to lower hub 72 by means of an assembly including an upper ring gear 82, a pinion shaft 84, pinion gears 86, and a lower ring gear 88 so that rotation of one of upper and lower circular disk structures 54 and 58 causes rotation of the other in the opposite, or counter-rotating, direction. Of course, an upper bearing set 90 and a lower bearing set 92 are provided so as to permit rotation of upper hub 62 and lower hub 72, respectively, around a mast 94 located concentrically about upper drive shaft portion 50.

Figure 4:
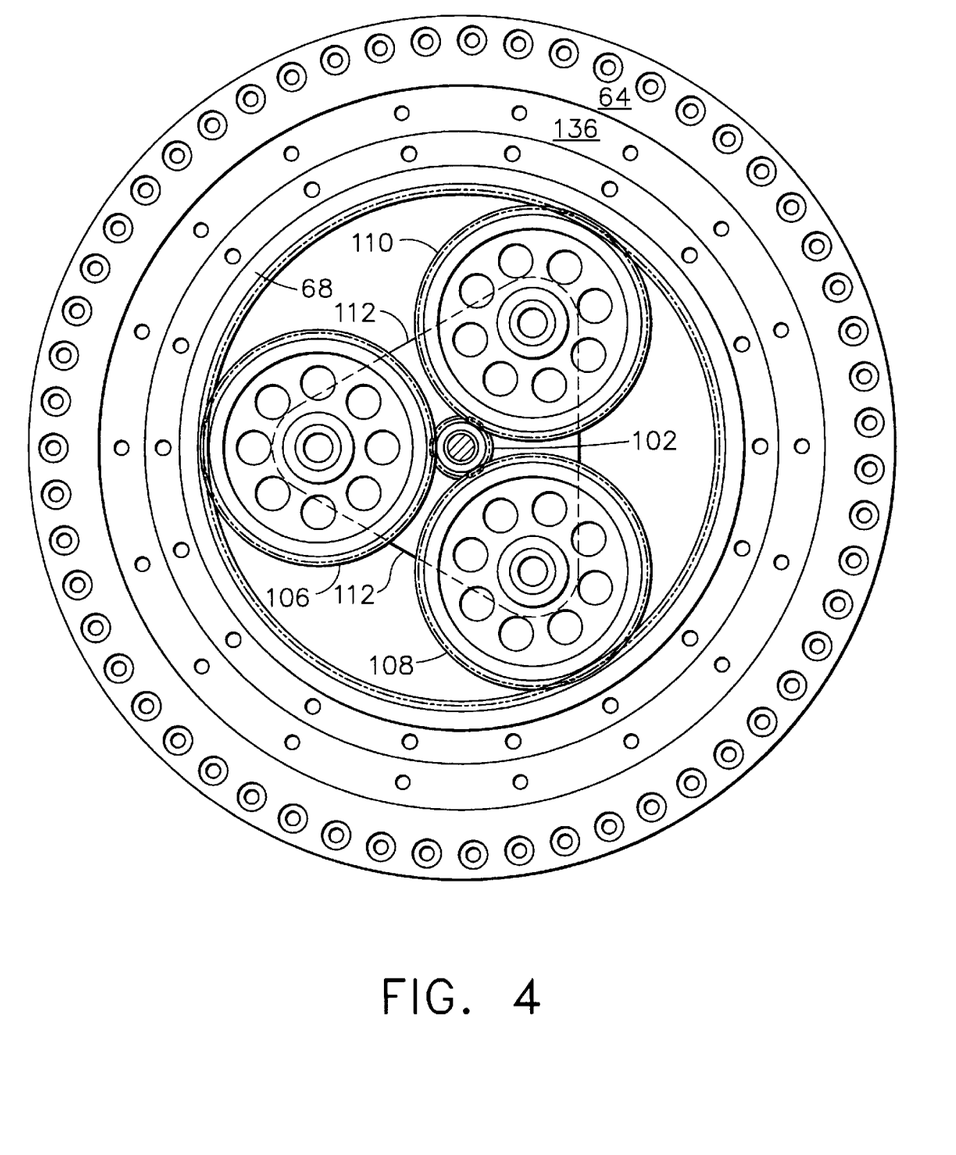
FIG. 4 is a top view of the disk hub assembly taken along line 4—4 of FIG. 2.

Contrary to the '376 patent, upper drive shaft portion 50 of lift rotor assembly 40 causes upper circular disk structure 54 to rotate. This is accomplished by a gear drive 96 coupled to the second or upper end of upper drive shaft portion 50, a first ring gear 98 coupled to upper hub 62, and a gear reduction apparatus 100 associated with gear drive 96 and first ring gear 98 so that the low torque of upper drive shaft portion 50 is translated into high torque for the operation of first ring gear 98. As further seen in FIG. 4, gear drive 96 is preferably a sun gear 102 rotatably coupled to upper drive shaft portion 50 by a sun gear spline 104 (see FIG. 5). Gear reduction apparatus 100 then preferably takes the form of a series of planetary gears, where sun gear 102 interacts with a first planetary gear 106, a second planetary gear 108, and a third planetary gear 110, which rotate about sun gear 102. It will be appreciated that the planetary gear arrangement functions as a torque multiplier in that it translates the low torque of sun gear 102 (which is directly related to that of upper drive shaft portion 50) to a high torque for first gear 98 that is used to cause upper hub 62 (and therefore upper circular disk structure 54) to rotate. By locating sun gear 102 and planetary gears 106, 108 and 110 in the last possible position of the drive system for lift rotor assembly 40, few components are exposed to the stress caused by the high torque thereon and the weight of such drive system is reduced.

Figure 5:
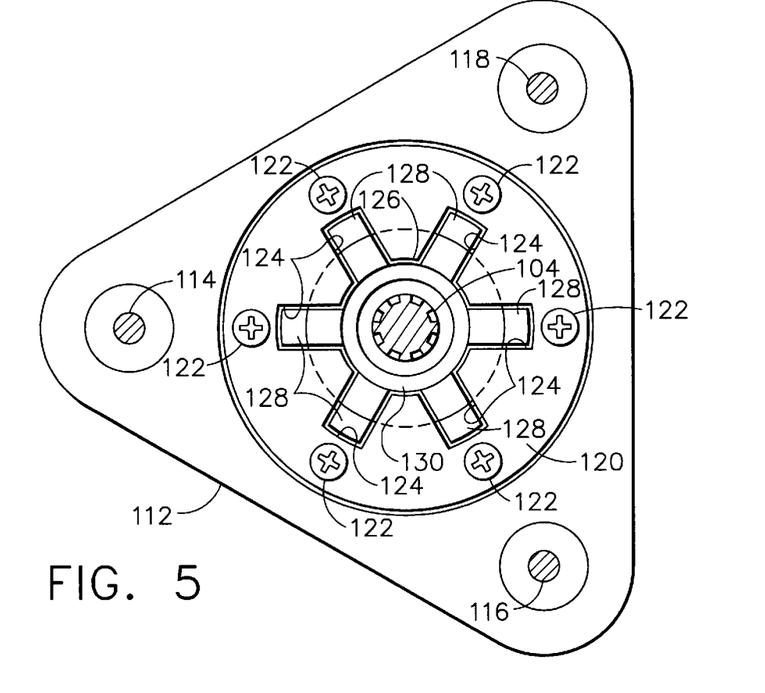
FIG. 5 is a top view of the disk hub assembly taken along line 5—5 of FIG. 2.

As best seen in FIG. 5, a planetary gear mount 112 functions to properly position planetary gears 106, 108 and 110 with respect to upper drive shaft portion 50 and mast 94. In this way, shafts 114, 116 and 118 for first planetary gear 106, second planetary gear 108 and third planetary gear 110, respectively, are also retained in position. It will be noted that a locking ring 120 is secured in place to planetary gear mount 112 by a plurality of fasteners 122. Additionally, locking ring 120 includes a series of spaced slots 124 located around a center opening 126 therethrough (for accommodating upper drive shaft portion 50), where castleated portions 128 of a mast nut 130 extend upwardly through such slots 124 to prevent potential backing off of mast nut 130 from mast 94.

It will be understood from FIG. 2 that the upper end of upper drive shaft portion 50 is housed within a bearing cap 132 which is located within a fairing 134 and a top cover plate 136 for lift rotor assembly 40. A flange bearing 138 is retained within bearing cap 132 by a clip ring 140 and interacts with top drive bearing 142 to accommodate the rotation of upper drive shaft portion 50.

Figure 3:
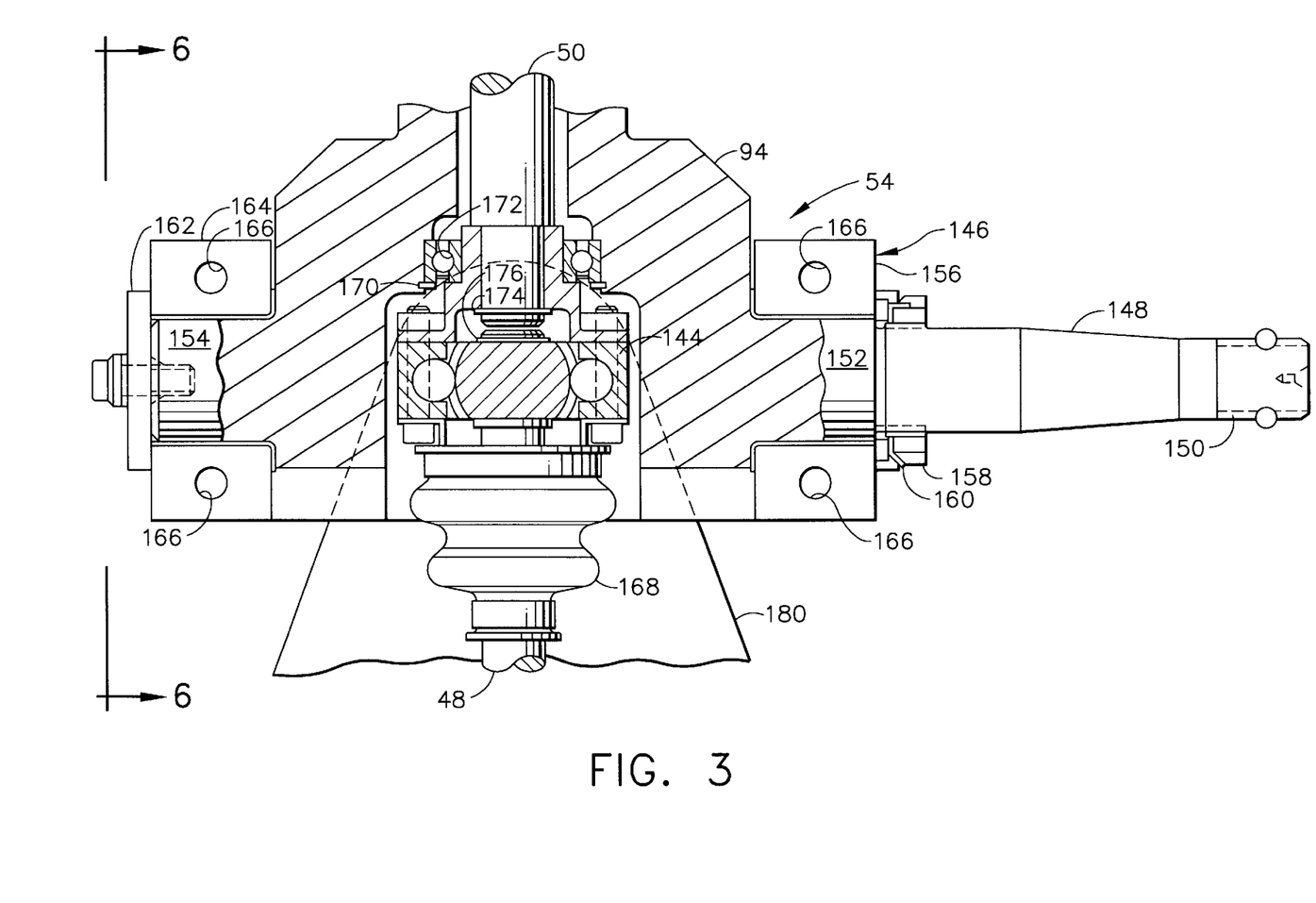
FIG. 3 is an elevational view of the gimbal mount assembly for the compound aircraft depicted in FIG. 1, taken in section in the plane of symmetry.

Returning to the connection of lower drive shaft portion 48 and upper drive shaft portion 50, FIG. 3 depicts gimbal mounting assembly 54 in greater detail. As shown therein, this coupling of lower and upper drive shaft portions 48 and 50 is accomplished by means of a constant velocity joint 144 housed within a gimbal box 146 and located along both the pitch and roll axes of a control shaft 148 for compound aircraft 10. Control shaft 148, which includes a spline 150 for the roll arm is interactive with a rear roll trunion 152 and a front roll trunion 154, extends from a rear frame 156 of gimbal box 146 and is held in place by a lock nut 158 and lock washer 160. A retaining disk 162 is used to maintain front roll trunion 154 is position adjacent front frame 164 of gimbal box 146. Of course, fasteners 166 fixedly retain rear and front frames 156 and 164, respectively, in parallel relationship by passing through clear holes in the ends of right and left frames 182 and 184 and thus forming gimbal box 146.

Figure 6:
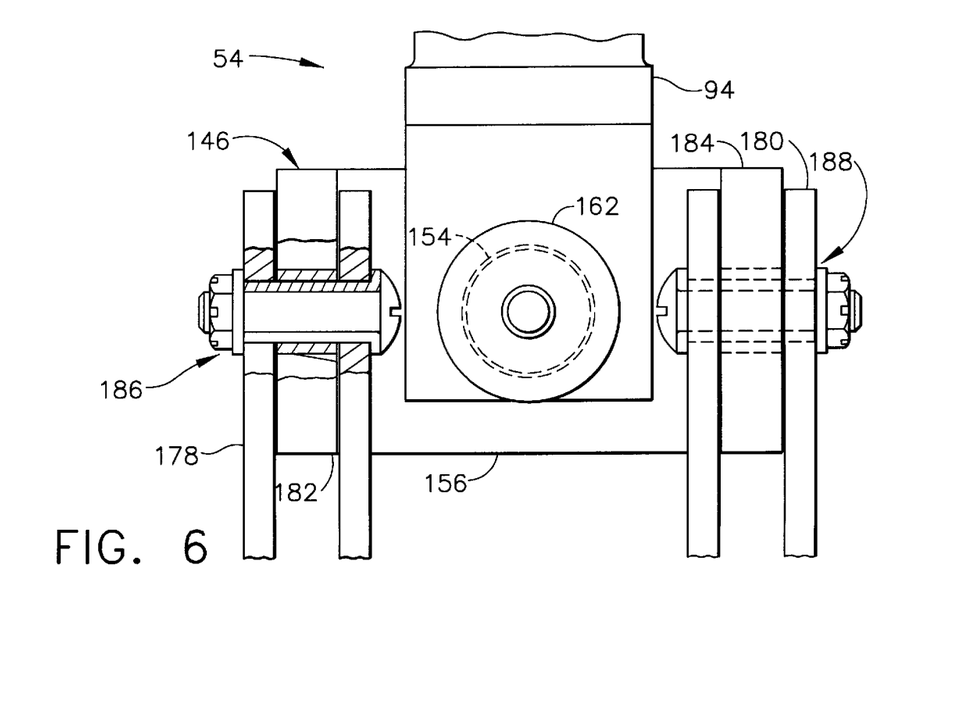
FIG. 6 is an aft looking forward view of the gimbal mount assembly taken along line 6—6 of FIG. 3.

A boot 168 is provided below such constant velocity joint 144 in order to collect extraneous lubrication. Clip ring 170 is utilized to retain bottom drive bearing 172 of upper drive shaft portion 50 in position, while clip rings 174 and 176 maintain the positioning of upper drive shaft portion 50 and lower drive shaft portion 48, respectively, with constant velocity joint 144. As seen in FIG. 6, fuselage hangers 178 and 180 are attached to the right and left frames 182 and 184, respectively, of gimbal box 146 by a pair of bolt/nut/washer combinations identified generally by the numerals 186 and 188.

As noted hereinabove, compound aircraft 10 may operate in either a rotary or fixed wing airfoil mode. In order to accomplish this, it is apparent that bladelets 56 and 60 would extend beyond the perimeter of upper and lower disk structures 54 and 58, respectively, when in the rotary mode so as to be wind driven and would preferably be retracted from such position and stowed within the perimeter of upper and lower disk structures 54 and 58 when in the fixed wing mode so as to avoid air flow. A bladelet stowage system, identified generally by the reference numeral 200 and shown in FIGS. 7–12, provides this function.

Figure 7:
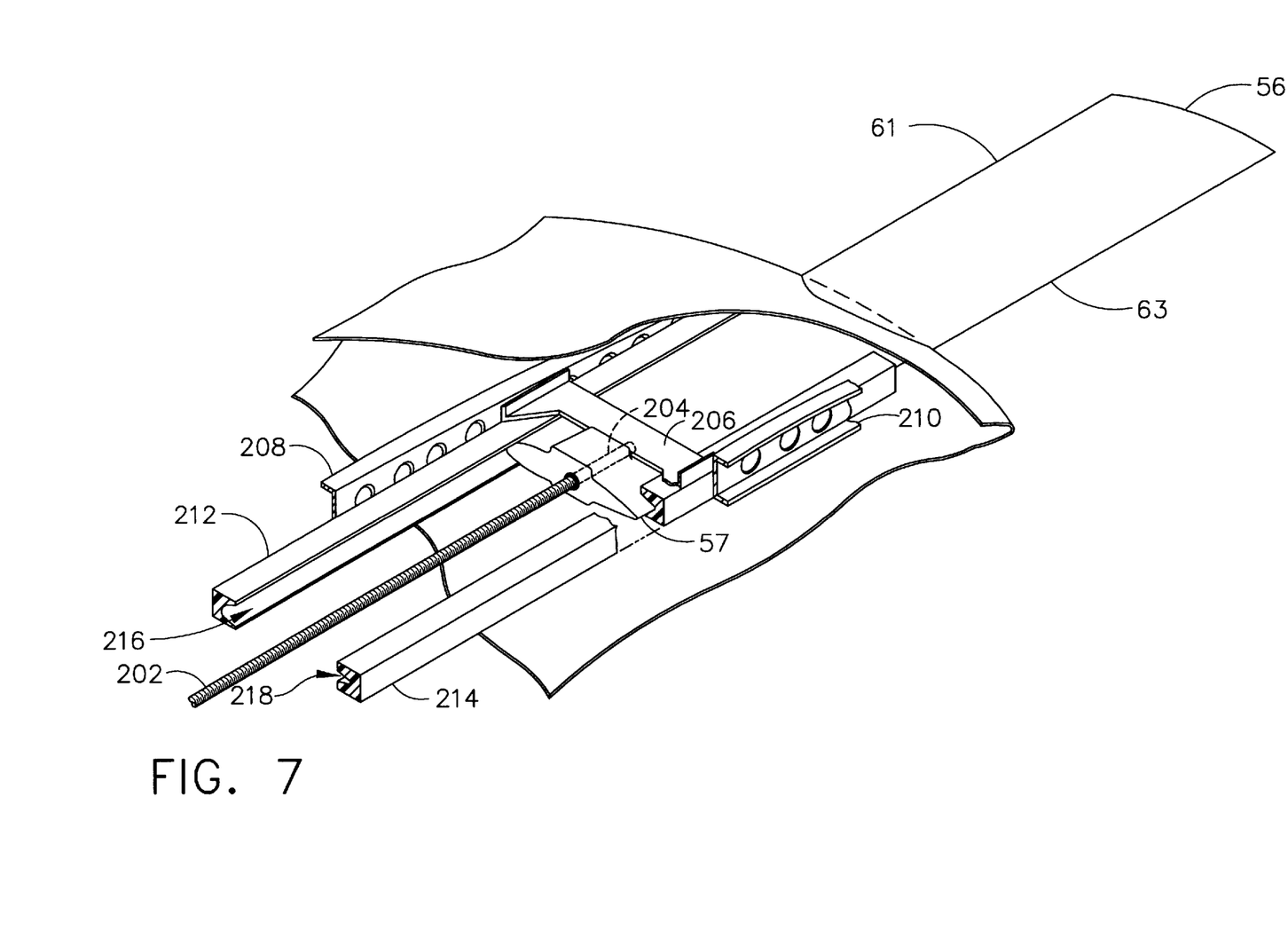
FIG. 7 is a partial perspective view of a retractable bladelet, with a portion of the cover plate being removed for clarity.

As best seen in FIG. 7, each bladelet 56 is attached to a motor screw 202, preferably via a ball nut assembly 204 incorporated into the root 57 thereof. It will be noted that each bladelet 56 includes a hollow portion 59 (see FIG. 9), which extends longitudinally therethrough so as to accommodate motor screw 202 between the extended and stowed positions of bladelets 56. In order to prevent bladelets 56 from being extended or retracted more than a predetermined amount, a pair of stop brackets 206 and 207 are preferably connected across the top surfaces of a pair of ribs 208 and 210 located in parallel orientation adjacent the leading and trailing edges 61 and 63, respectively, of bladelets 56. It will be understood that stop brackets 206 and 207 work in conjunction with bladelet root 57, which is somewhat enlarged in shape to house ball nut assembly 204 therein. Further, stop bracket 206 is shown to prevent bladelet 56 from extended past a desired position and stop bracket 207 is shown to prevent bladelet 56 from being retracted past a desired stowed position. In practice, the range of extension for bladelet 56 beyond the periphery of upper disk 54 (as indicated by distance d) is preferably in the range of approximately one-half to one-third the disk radius.

It will further be seen that a pair of slides 212 and 214 are also preferably connected to the inner side surfaces of ribs 208 and 210, respectively, so that leading edge 61 and trailing edge 63 of bladelet 56 are maintained within pockets 216 and 218 formed therein. While some clearance for leading and trailing edges 61 and 63 is preferred within pockets 216 and 218, slides 212 and 214 help to ensure that bladelets 56 stay in the desired position.

Figure 8:
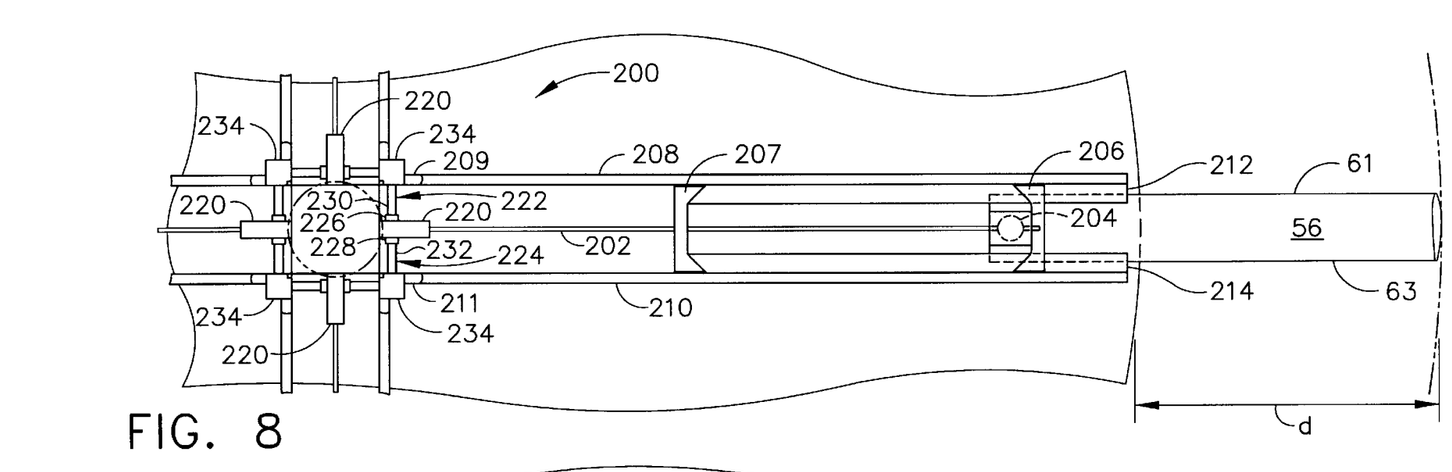
FIG. 8 is a partial, diagrammatic side view of the bladelet stowage system for the upper disk of the compound aircraft shown in FIGS. 1–6, where the bladelet is in the extended position.
Figure 9:
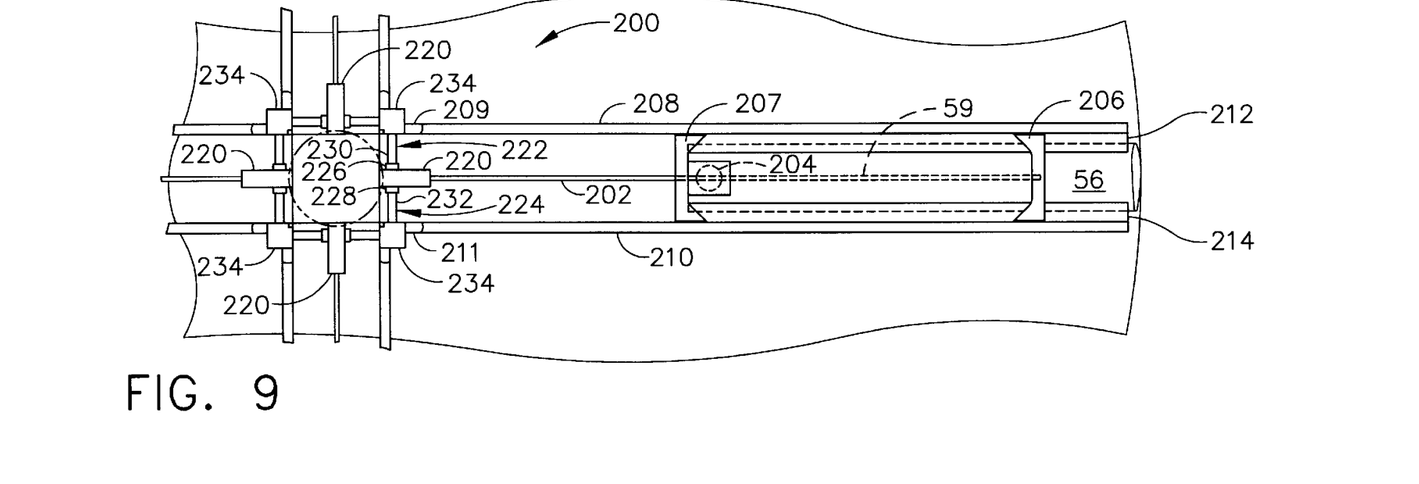
FIG. 9 is a partial, diagrammatic side view of the bladelet stowage system for the upper disk depicted in FIG. 8, where the bladelet is in the stowed position.

As seen in FIGS. 8 and 9, where bladelet 56 is shown as being in the extended and retracted positions, it will be noted that each motor screw 202 is preferably driven by an individual wing motor 220. Each wing motor 220 is attached to ribs 208 and 210 at motor brackets 209 and 211 (see FIG. 12), which are specific localized area of ribs 208 and 210, via trunions 222 and 224 consisting of mounts 226 and 228 and shafts 230 and 232, respectively. This is necessary in order for such trunions 222 and 224 to be placed within the space available in the structure of upper disk 54.

Figure 10:
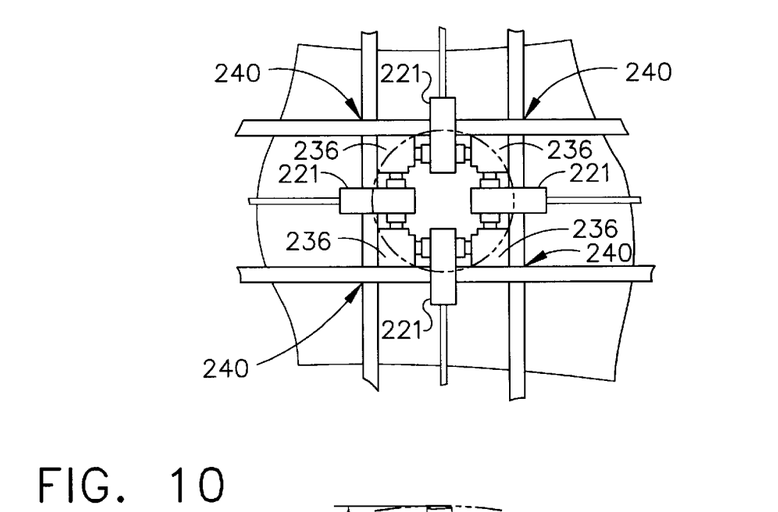
FIG. 10 is an enlarged partial view of a bladelet stowage system for the lower disk of the compound aircraft shown in FIGS. 1–6 similar to that depicted for the upper disk in FIGS. 8–9.
Figure 11:
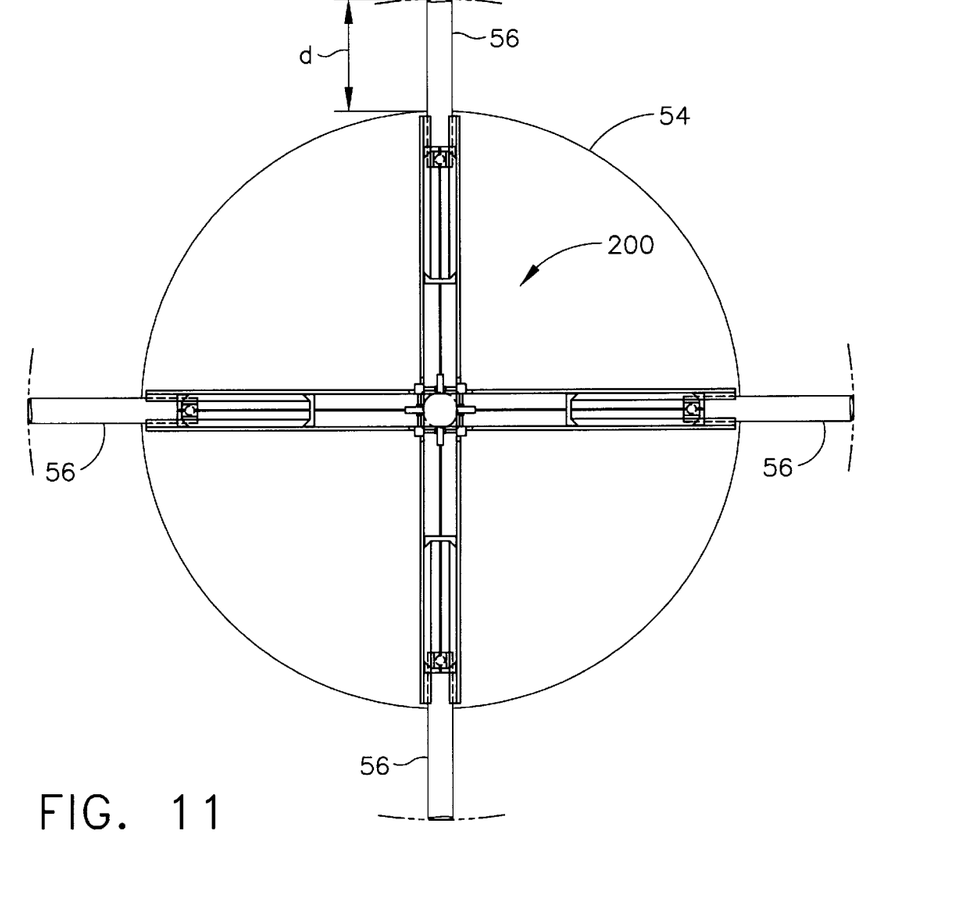
FIG. 11 is a top diagrammatic view of the bladelet stowage system for the upper disk shown in FIGS. 8–9.

A pair of 90° gear boxes 234 are preferably provided on each side of wing motors 220 so that they are all connected in parallel. In this way, extension and retraction of bladelets 56 is done in unison. Additionally, gear boxes 234 are able to maintain consistent movement of bladelets 56 through at least one wing motor 220 should one or more of the others become inoperable. An appreciation of the consistent locations for bladelets 56 when in the extended position is obtained by viewing FIG. 11. Naturally, positioning of gear boxes 234 involves taking into account the various rib intersections for each bladelet 56 in view of the disk structure. Accordingly, FIGS. 8 and 9 depict gear boxes as being mounted to the outside of the rib intersections (identified by the numeral 238) for upper disk 54 and FIG. 10 depicts gear boxes 236 as being mounted to the inside of the rib intersections (identified by the numeral 240) for lower disk 58.

Figure 12:
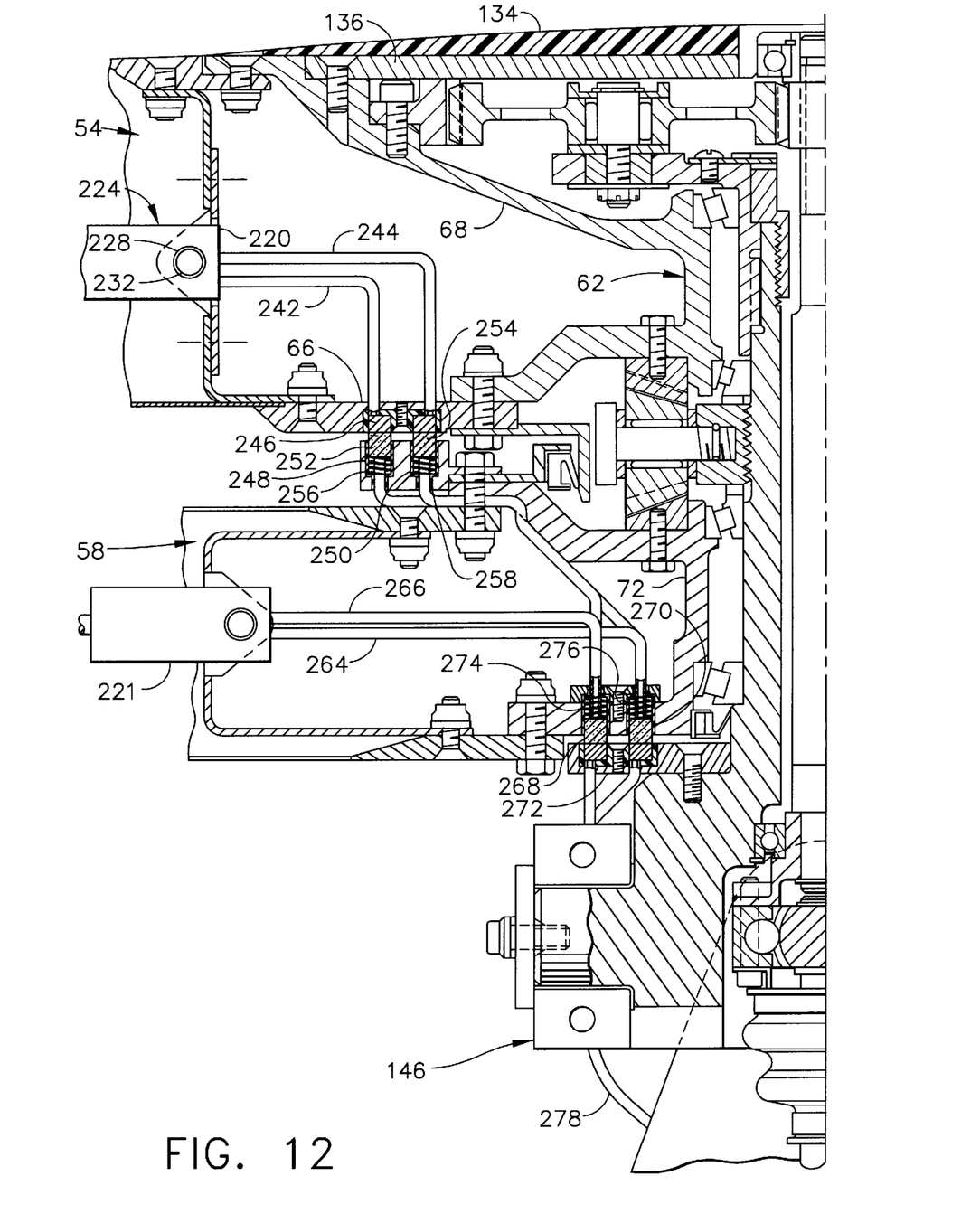
FIG. 12 is a partial elevational view, taken in section in the plane of symmetry, of the disk hub assembly for the compound aircraft depicted in FIG. 2, further including the bladelet stowage systems for the upper and lower disks shown in FIGS. 8–11.

In FIG. 12, it will be seen that a pair of leads 242 and 244 supply electricity to wing motors 220 located within upper disk 54. More specifically, a conductive ring 246 is positioned within lower root 66 of upper disk structure 54, where conductive ring 246 includes a pair of grooves 248 and 250 therein for housing a corresponding pair of brushes 252 and 254 within insulation and held in place by springs 256 and 258. It will be understood that this arrangement may be utilized with each wing motor 220 or a wire may be supplied from one wing motor to the others, so long as each motor receives a common source of electricity.

It will be understood that stowage of bladelets 60 within lower disk 58 is accomplished in the same manner as described above with regard to bladelets 56 in upper disk 54. Although upper disk 54 and lower disk 58 rotate in opposite directions, lower disk 58 likewise has a conductive ring 260 positioned within lower flange 80 thereof and a gimbal ring plate 262. Leads 264 and 266 supply electricity to wing motors 221 of lower disk 58 in a manner similar to that for upper disk 54, whereby brushes 268 and 270 are housed in a double groove insulator 272 and held in place by springs 274 and 276. A flex cable 278 is utilized to provide electricity to both sets of brushes 252/254 and 268/270.

Having shown and described the preferred embodiment of the present invention, further adaptations of the lift rotor assembly, as well as the bladelet retraction assembly, for a compound aircraft can be accomplished by appropriate modifications by one of ordinary skill in the art without departing from the scope of the invention.

I claim:

1. A lift rotor assembly for a compound aircraft having a fuselage, comprising:
   (a) at least one circular disk structure with a plurality of bladelets spaced peripherally thereabout;
   (b) a drive shaft coupled to a power source at a first end for rotating said drive shaft at low torque;
   (c) a hub coupled to each circular disk structure, wherein each said hub is located concentrically about said drive shaft;
   (d) a gear drive coupled to a second end of said drive shaft opposite said fist drive drive shaft end;
   (e) a first gear coupled to said gear drive and the hub for the circular disk structure located adjacent to said gear drive; and
   (f) a gear reduction apparatus associated with said gear drive and said first gear, wherein the low torque of said first drive shaft end is translated into high torque for the operation of said first gear and rotation of said adjacently located circular disk structure.

2. The lift rotor assembly of claim 1, further comprising a second gear connecting an upper hub for a first circular disk structure and a lower hub for a second circular disk structure, said second gear causing said second circular disk structure to be rotated in a direction opposite said first circular disk structure.

3. The lift rotor assembly of claim 1, further comprising a gimbal mount connecting an upper portion and a lower portion of said drive shaft.

4. The lift rotor assembly of claim 3, further comprising a power transfer shaft connected to said power source, wherein said lower portion of said drive shaft and said power transfer shaft are coupled so as to be oriented substantially perpendicularly.

5. The lift rotor assembly of claim 3, said gimbal mount further comprising a constant velocity joint for coupling said upper and lower portions of said drive shaft in substantial alignment.

6. The lift rotor assembly of claim 1, wherein said lift rotor assembly is located outside said fuselage.

7. A lift rotor assembly for a compound aircraft having a fuselage, comprising:
   (a) a first circular disk structure with a plurality of bladelets spaced peripherally thereabout;
   (b) a second circular disk structure with a plurality of bladelets spaced peripherally thereabout, said second circular disk structure being located below said first circular disk structure;
   (c) a drive shaft coupled to a power source at a first end for rotating said drive shaft at low torque;
   (d) a first hub coupled to said first circular disk structure, said first hub being located concentrically about said drive shaft;
   (e) a second hub coupled to said second circular disk structure, said second hub being located concentrically about said drive shaft;
   (f) a gear drive coupled to a second end of said drive shaft opposite said first drive shaft end;
   (g) a first gear coupled to said gear drive and said first hub;
   (h) a gear reduction apparatus associated with said gear drive and said first gear, wherein the low torque of said first drive shaft end is translated into high torque for the operation of said first gear and rotation of said first circular disk structure; and
   (i) a second gear connecting said first hub and said second hub, wherein said second gear causes said second circular disk structure to be rotated in a direction opposite said first circular disk structure.

8. The lift rotor assembly of claim 7, further comprising a gimbal mount connecting a lower portion and an upper portion of said drive shaft.

9. The lift rotor assembly of claim 8, wherein said lower and upper portions of said drive shaft are coupled in substantial alignment by a constant velocity joint.

10. The lift rotor assembly of claim 9, further comprising:
    (a) a power transfer shaft connected to said power source; and
    (b) a gear box connecting said power transfer shaft and said lower portion of said drive shaft in substantially perpendicular orientation.

11. The lift rotor assembly of claim 7, further comprising means for extending and retracting said bladelets of said first and second circular disk structures.

12. The lift rotor assembly of claim 11, wherein said bladelets of said first and second disk structures are extended beyond the perimeter thereof when said compound aircraft is operated in a rotary wing mode so as to be wind driven.

13. The lift rotor assembly of claim 12, wherein said first and second disk structures are positioned so as to cooperatively form an airfoil with auto-gyrating capability.

14. The lift rotor assembly of claim 12, wherein said compound aircraft operates as a helicopter.

15. The lift rotor assembly of claim 12, wherein said bladelets of said first and second disk structures are retracted and stowed within the perimeter thereof when said compound aircraft is operated in a fixed wing mode so as to avoid being wind driven.

16. The lift rotor assembly of claim 11, further comprising a clutch for selectively engaging and disengaging said power transfer shaft from said power source depending on the operational mode of said compound aircraft.

17. A compound aircraft formed with a fuselage body and having vertical ascent, hovering and descent capabilities along with conventional take-off and landing capabilities, comprising:

(a) an upper circular lift disk structure having a set of bladelets uniformly distributed around and secured to the periphery thereof;

(b) a lower circular lift disk structure having a set of bladelets uniformly distributed around and secured to the periphery thereof, said lower circular lift disk structure being positioned with respect to said upper circular lift disk structure so as to perform as a single aerodynamic lifting body;

(c) a lift rotor assembly for driving said upper and lower circular lift disk structures;

(d) a power supply;

(e) a power transfer shaft coupled to said power supply at a first end and said lift rotor assembly at a second end;

(f) a clutch for selectively engaging and disengaging said power transfer shaft from said power supply;

(g) a source of forward flight propulsion for providing a range of thrust;

(h) a coupling between said power supply and said forward flight propulsion source; and (i) means for extending and retracting said bladelets of said upper and lower circular lift disk structures.

18. The compound aircraft of claim 17, wherein said bladelets of said upper and lower circular lift disk structures are extended beyond the perimeter thereof when said compound aircraft is operated in a rotary wing mode.

19. The compound aircraft of claim 17, wherein said bladelets of said upper and lower circular lift disk structures are retracted within the perimeter thereof in a stowed position when said compound aircraft is operated in a fixed wing mode.

20. The compound aircraft of claim 17, said bladelet extension/retraction means further comprising:

(a) a power source;

(b) a ball nut assembly located within a root portion of each said bladelet;

(c) a plurality of motor screws driven by said power source at a first end and connected to one of said ball nut assemblies at a second end; and (d) a pair of ribs oriented in parallel and located adjacent the leading and trailing edges of each said bladelet;

wherein said bladelets are extended and retracted by rotating said motor screws in a first and second direction, respectively.

21. The compound aircraft of claim 20, further comprising a first stop bracket connected across each said pair of ribs which interacts with said bladelet root portion to prevent said bladelets from extending beyond the perimeter of said upper and lower circular lift disk structures more than a predetermined amount.

22. The compound aircraft of claim 21, wherein said predetermined amount is in a range of approximately one-half to one-third the radius of said upper and lower circular lift disk structures.

23. The compound aircraft of claim 20, further comprising a pair of slides connected to and positioned adjacent each said pair of ribs, said slides each including a pocket formed therein so as to envelope the leading and trailing edges of said bladelets.

24. The compound aircraft of claim 20, said power source comprising a wing motor connected to and positioned between each said pair of ribs so as to receive one of said motor screw first ends.

25. The compound aircraft of claim 24, wherein the wing motors for said upper circular lift disk structure are interconnected via gear boxes so that movement of said bladelets thereof is in unison.

26. The compound aircraft of claim 24, wherein the wing motors for said lower circular lift disk structure are interconnected via gear boxes so that movement of said bladelets thereof is in unison.

27. The compound aircraft of claim 25, wherein said gear boxes are mounted to the outside of each intersection between adjoining ribs for said bladelets.

28. The compound aircraft of claim 26, wherein said gear boxes are mounted to the inside of each intersection between adjoining ribs for said bladelets.

29. The compound aircraft of claim 20, further comprising a second stop bracket connected across each said pair of ribs which interacts with said bladelet root portion to prevent said bladelets from retracting beyond the stowed position.

* * * * *